G. Atkinson,
Carriage Body Knife.
No. 112,311. Patented Mar. 7, 1871.
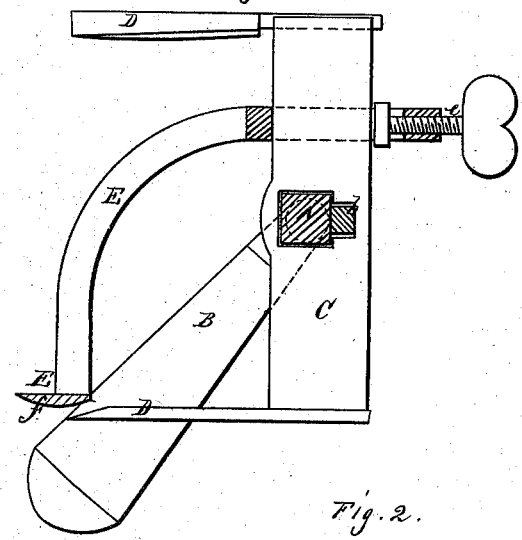
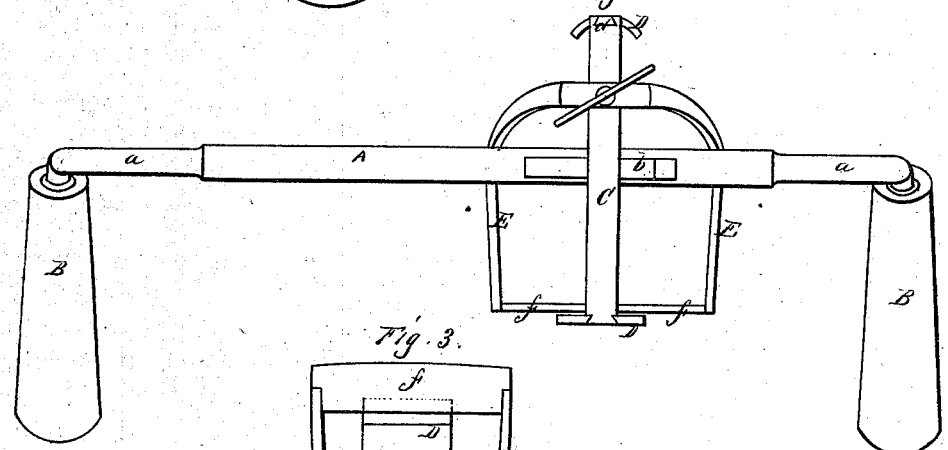
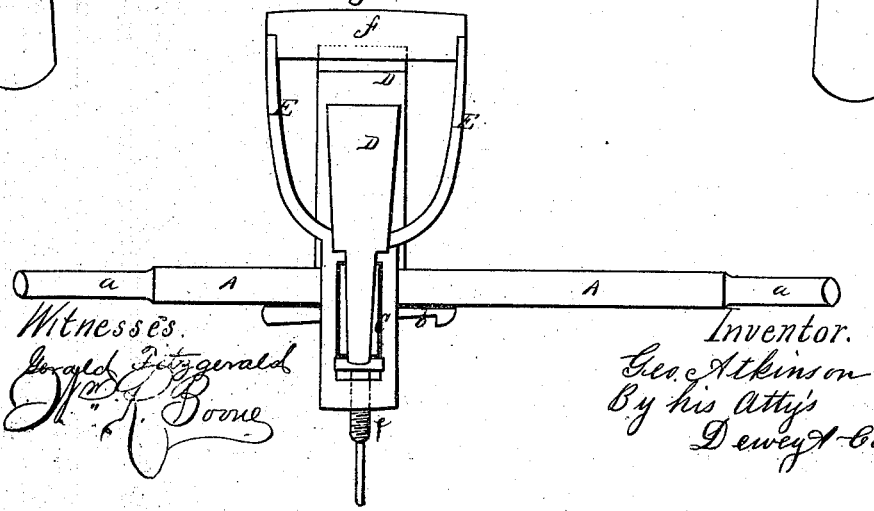
Witnesses.
Gerald Fitzgerald
Wm. R. Boone
Inventor.
Geo. Atkinson
By his Atty's
Dewey & Co

UNITED STATES PATENT OFFICE.

GEORGE ATKINSON, OF SAN FRANCISCO, CALIFORNIA.

IMPROVEMENT IN TOOLS FOR CARRIAGE-MAKERS' USE.

Specification forming part of Letters Patent No. 112,311, dated March 7, 1871.

*To all whom it may concern:*

Be it known that I, GEORGE ATKINSON, of the city and county of San Francisco, State of California, have invented an Improved Body-Knife for Carriages; and I do hereby declare the following description and accompanying drawing are sufficient to enable any person skilled in the art or science to which it most nearly appertains to make and use my said invention and improvements without further invention or experiment.

My invention relates to a knife or planing-tool for forming the bodies of carriages, and for other similar work; and it consists of a bar of metal, which is provided with suitable handles, upon which can be fixed, at any desirable point, a tool-holder.

Various sizes and styles of knives or planes can be attached to the holder for the different kinds of work required, and a gage or fender is also secured upon it in such a manner as to serve for all of the tools employed.

In order to explain my invention, so that others will be able to understand its construction and operation, reference is had to the accompanying drawing, forming a part of this specification, in which—

Figure 1 is a sectional elevation. Fig. 2 is a back view. Fig. 3 is a top view.

A represents a square bar of metal, which can also, if desired, be made triangular or polygonal. Each end of this bar is reduced, as shown, and made round, forming shanks *a a*. The extreme ends of the bar are bent at right angles and fitted with handles B B, thus forming a tool similar to a draw-shave.

The tool-holder C consists of a metal bar, which is provided at its middle with a square hole large enough to allow the holder to be slipped on over the square bar A. On one side of the square opening in the tool-holder C is a recess, into which a wedge or key, *b*, is placed. This wedge serves to fasten the tool-holder at any point along the bar A it is desired to secure it.

Both ends of the tool-holder are provided with dovetail slots *d g*, made transversely to the length of the bar A. In these dovetail slots are placed the stems of the various tools it is desired to employ, which are made to correspond with the dovetails in the holder. The dovetails may be made, as shown, at either end of the tool-holder, and the tools D constructed so that the rear end of the blades, planes, or chisels shall fit into them and be firmly held.

By this arrangement the tool-holder can be shifted from one end of the bar A to the other, and secured at any intermediate point by the wedge or key *b*, thus allowing it to be adjusted to suit the convenience of the operator.

A gage, E, is also constructed, with an opening which allows it to be slipped down over the upward-projecting or idle end of the tool-holder, and confined by a set-screw, *e*. This gage is so constructed that when thus secured a guard, *f*, will stand just above the knife, plane, or chisel, at a distance above it to be regulated by the set of the gage, and thus not only regulate the depth to be cut, but protect the edge of the tool from being injured.

When it is desired, the tool-holder can be changed end for end by loosening the wedge *b* and shifting the tool-holder to the reduced shank *a*, and, after turning it, replace it on the bar A.

With this implement carriage-bodies can be worked with great facility, and any number of cutting-chisels, gouges, and planes be kept on hand to be used on the tool-holder when required, each one being constructed to fit the dovetail grooves.

Having thus described my invention, what I claim, and desire to secure by Letters Patent, is—

1. The adjustable tool-holder C, provided with dovetail grooves *d*, substantially as and for the purpose above described.

2. The bar A, in combination with the tool-holder C and wedge or key *b*, substantially as and for the purpose above described.

3. The gage or fender E, provided with the guard *f*, and secured upon the tool-holder C by means of the set-screw *e*, in the manner and for the purpose above described.

In witness that the above-described invention is claimed by me I have hereunto set my hand and seal.

GEORGE ATKINSON. [L. S.]

Witnesses:
JNO. L. BOONE,
GERALD FITZGERALD.